United States Patent [19]

Burwall

[11] 4,189,247
[45] Feb. 19, 1980

[54] STRUCTURAL CONNECTOR

[76] Inventor: Sten B. Burwall, Hjartervagen 7, 142 00 Trangsund, Sweden

[21] Appl. No.: 926,444

[22] Filed: Jul. 20, 1978

[51] Int. Cl.² .............................................. F16B 7/00
[52] U.S. Cl. ...................................... 403/4; 403/172; 182/186; 52/93
[58] Field of Search ....................... 403/3, 4, 172, 176, 403/217, 219; 52/93, 713; 182/186, 224, 225, 226

[56] References Cited

U.S. PATENT DOCUMENTS

| 128,332 | 6/1872 | Smith | 182/186 X |
|---|---|---|---|
| 288,651 | 11/1883 | Miller | 182/225 |
| 1,685,283 | 9/1928 | Gibson | 182/186 |
| 2,555,503 | 6/1951 | Morton | 182/226 |
| 3,078,956 | 2/1963 | Larson | 182/225 |
| 3,289,789 | 12/1966 | Larson | 182/226 |
| 3,423,898 | 1/1969 | Tracy et al. | 52/713 |

FOREIGN PATENT DOCUMENTS 95591 5/1939 Sweden .................................. 182/226

*Primary Examiner*—Andrew V. Kundrat
*Attorney, Agent, or Firm*—Roylance, Abrams, Berdo & Farley

[57] ABSTRACT

A connector for connecting together the structural members of frame works comprises two identical halves having means for receiving respective ends of said members. The two halves of the connector pivotably coupled together to permit the halves to be pivoted between a first position in which the structural members are arranged at a first angle and a second position in which the structural members are arranged at a second angle. In each of the first and second positions, a mouth is provided for receiving a third structural member. The advantage afforded by the present invention is that a single connector may be employed to position different frame members at selected angles therebetween.

7 Claims, 7 Drawing Figures

STRUCTURAL CONNECTOR

The present invention relates to connectors for removably connecting together the frame members of so-called gable and trestle frame structures. A gable frame structure is a structure in which the mutual angle between adjacent members ranges approximately from 100° to 140° whilst a trestle frame structure is one in which this mutual angle ranges approximately from 30° to 50°.

Connectors for the frame members of trestle structures are normally made of pressed sheet metal and are arranged to receive the ends of respective members, these members being secured in the connectors either by nailing or clamping. Also known are connectors which are formed of welded, rectangular tubes and are provided with clamping screws. Although such connectors provide a more stable structure, the overall cost is higher.

With regard to connectors for removably connecting together the frame members of a gable frame structure, reference is made to the Swedish Patent Specification No. 389156. This Patent Specification describes a connector which can be used at all connecting locations in the structure. For the sake of simplicity, this connecting element will be referred to here as the main connecting element. The gable frame, or intermediate frame, of a wooden frame structure of the gable-roof type comprises two legs and two trusses connected together at three corner points at angles to one another. These angles are equal to the angles at which the members are received by main connecting element, i.e. the mutual angles formed by the long axes of respective receiving sockets. At angles of 120° there is obtained a frame structure having vertically extending legs and a roof which slopes at 30°. The angle can be made greater, up to approximately 140°. There is then obtained a structure whose legs extend obliquely outwardly and whose roof has a smaller degree of slope. The angle may also be smaller than 120°, which provides a structure with a greater degree of roof slope and legs which extend obliquely inwardly.

The frame members of these frame structures are connected together by means of longitudinally extending studs which project outwardly from the frame structures at their connecting points at an angle of 90°. On the gable frame structures, these studs project outwardly along one axis while on the intermediate frame structures they project along respective axes in two opposite directions. The main connecting element thus comprises two connecting members, e.g. in the form of sleeves, which are so oriented relative to one another that the included angle between the said axes is approximately 120°, to which the axes of further connecting elements form a right angle.

The coupling element intended for trestle-like frame structures is approximately the same as that for use with gable-structures, but with the important difference that the angle between the legs is approximately 40° with an approximate variation from 30° to 50°, and hence each frame structure comprises solely two legs which include a single angle.

Boats which are kept on land during the winter are normally placed on trestles. The structure covering the boat is normally a so-called A-structure, i.e. a further trestle-like structure over which a tarpaulin is placed. When coupling the frame members together there is either used trestle-like fittings with trestle-legs which stand on the boat, or the aforementioned main connecting elements with house-like frame structures which normally extend down to the ground externally of the boat. Often it is necessary to use both trestle-like fittings and said main coupling elements.

The present invention relates to a connector which can be adapted for use with both a trestle-like structure and a gable-like structure. By rotating two coupling halves around an axis there is obtained two different positions at angles of 40° and 120° respectively. The connector can be made by taking, for example, two pieces of sheet steel and bending the same to a given pattern, to fashion, in this way, the two halves of the connector. The two identical halves of the connector are then connected together at two hinge locations. When the legs are inserted into the connecting members of the connector from one direction and a ridge pole or purlin is then clamped in the connector, the angle will be 40°. The trestle legs are then fixed to the connector halves by means of nails, screws or bolts. The longitudinally extending studs are clamped securely between the connector halves. By rotating the trestle halves at their hinged locations and inserting thereinto, in this case, the roof trusses or combination of roof trusses and legs from the other direction and securely clamping the purlin, the angle between the connecting members is approximately 120° and the connector functions as a main connecting element.

The connecting members can, similarly as the main coupling element according to said patent, be of any desired shape, such as rectangular or circular, and primarily closed shapes or open shapes such as flat, U-shaped, V-shaped or L-shaped cross-sections.

Conveniently the aforementioned coupling halve may comprise two parts, e.g. two side plates. These are connected to each other and to the stud by means of bolts and function as described above. The parts may either be exactly the same or a mirror image of each other, when they are provided with wing-like members for attachment to the purlins. The advantage afforded hereby is that manufacture is simpler and less expensive whilst the coupling elements require less storage space.

In accordance with a further embodiment of the invention, the coupling halves may be given mutually different angles whilst the legs (rafters) are still inserted from the same direction. This is possible when the mutual connecting points of the coupling halves have two positions on a longer angled arm. At its outer connection attachment the purlin is placed against one side of the coupling arm, which lies at an angle of 60° to the longitudinal direction of the leg, whereupon the angle of 120° is obtained between the legs. On the other side, the other end of said one side, which firmly presses the purlin, merges, via an angle of 140°, with a new side for clamping the purlin and obtains an angle of 20° to one leg, whereupon an angle of 40° is obtained between the legs. The connecting points are located in their inner positions. p The disadvantage with the coupling of all these embodiments used as a main connecting element is that, because of their adjustability, they are weaker, more rickety and more difficult to handle compared with the embodiment described in said patent. This weakness must be compared against the expanded field of use.

An embodiment of the invention will now be described in more detail with reference to the accompanying drawings, in which.

Figure 1:
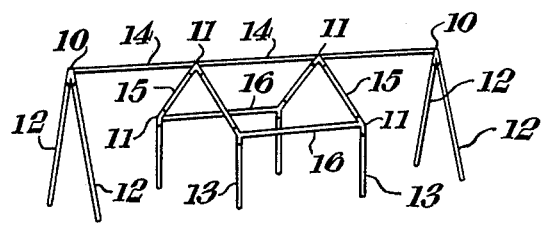
FIG. 1 illustrates a structure for covering boats joined together with connecting elements according to the invention, partly in the form of trestle couplings (10) and partly in the form of main-connecting elements (11)
Figure 2:
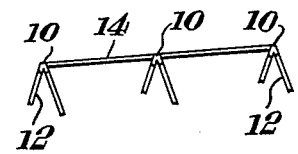
FIG. 2 illustrates the trestle joined together with connecting elements according to the invention in the form of trestle couplings (10)

The structural connector of the present invention may be used as a trestle coupling 10 or as a main connecting element 11 by adjusting the position thereof. FIG. 1 illustrates a structure joined by the use of structural connectors 10, 11 formed according to the present invention. The structural members joined by the structural connectors 11 are uprights 13, ridgepole or purlin 14, rafters 15 and a top plate or a wall plate 16. The structural members connected by the structural connectors 10 are the trestle legs 12 and the ridgepole or purlin 14 via the structural connectors 11. In FIG. 2, the legs 12 and the purlin 14 are joined together to form a trestle-like structure by the structural connector 10.

The details of the structural connector are illustrated in FIGS. 3-7. This structural connector may be employed to connect the structural members at all corners and connection locations in the structure illustrated in FIG. 1 and the trestle-like structure illustrated in FIG. 2.

The structural connector comprises two substantially identical halves or portions 3, 4 which are pivotably connected by the fastener 25 extending therethrough. Each portion 3, 4 is formed of sheet metal which is cut and bent to the desired configuration. The structural connector may be pivoted to either of two adjustable positions so that it may form either of the connectors 10, 11, as desired, in order to connect the structural members at all corners and connection locations in the structure of FIG. 1 or the trestle-like structure of FIG. 2.

The first connector portion 3 has a first attaching means 21. The attaching means 21 is channel-shaped and has a first fixing surface 31 with openings 32 through which fasteners may extend to attach a structural member thereto. The first portion 3 also has first and second securing flanges 33, 34 provided on opposite ends of the portion 3 and extending from the opposite lateral sides of the portion 3. The securing flanges 33 have first and second securing surfaces 35, 36, respectively. The securing surfaces 35 are oriented at a 20° angle relative to the fixing surface 31, while the securing surfaces 36 are oriented at a 60° angle relative to the fixing surface of 31.

Simiarly, the second portion 4 also has an attachment means 22, a fixing surface 37 with openings 38 therein, oppositely directed third securing flanges 39 with securing surfaces 40 oriented at a 20° angle relative to the fixing surface 37, and oppositely directed fourth securing flanges 41 with fourth securing surfaces 42 oriented at a 60° angle relative to the fixing surface 37.

Figure 3:
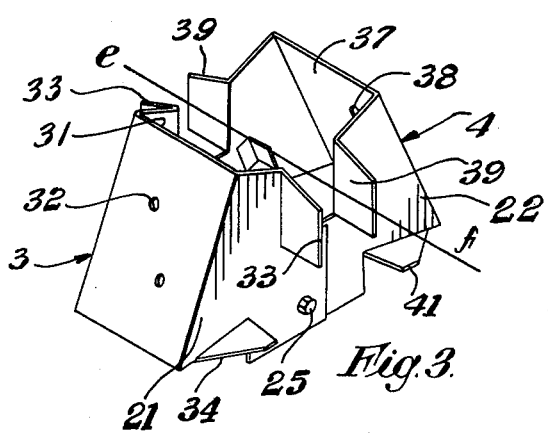
FIG. 3 illustrates in perspective an embodiment of a connecting element in the form of a trestle coupling (10)
Figure 4:
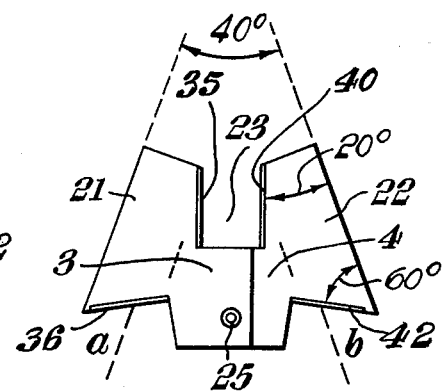
FIG. 4 is a side view of a connecting element in the form of a trestle coupling (10)

The connector portions 3, 4 are illustrated in FIGS. 3 and 4 in a first position intended for securing legs 12 of a trestle-like structure by means of nails, screws or bolts in the directions a, b with an included angle of approximately 40°.

In this first position, the securing surfaces 35, 40 of the flanges 33,39, respectively, are parallel and define an attachment means or a first mouth 23 for securing a structural member therein which extends transversely of a plane extending normal to the axis of pivot 25 (i.e., which extends in directions e, f).

Figure 5:
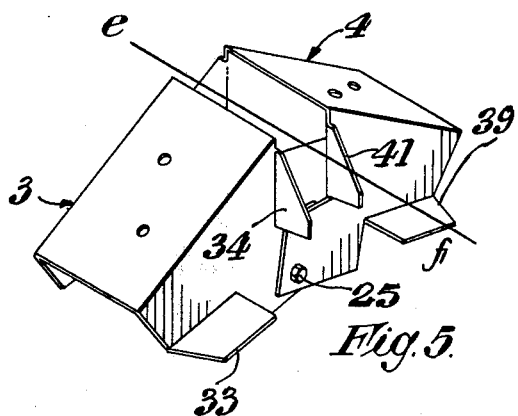
FIG. 5 is a perspective view of an embodiment of a connecting element in the form of a main connecting element (11)
Figure 6:
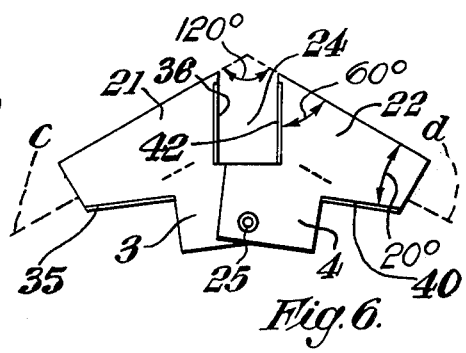
FIG. 6 is a side view of the connecting element in the form of a main connecting element (11)

FIGS. 5 and 6 illustrate the portions 3, 4 arranged in a second position for connecting rafters 15 and uprights 13 in directions c, d with an included angle of approximately 120°. In this second position, the portions 3, 4 have been pivoted and inverted from the position illustrated in FIGS. 3 and 4. In this position, the securing surfaces 36, 42 of the flanges 34, 39, respectively, are parallel and define an attachment means or second mouth 24 for securing ridgepoles 14 or top plates 16 to extend transversely of a plane extending normal to the axis of pivot 25 (i.e., in directions e, f illustrated in FIG. 5).

Figure 7:
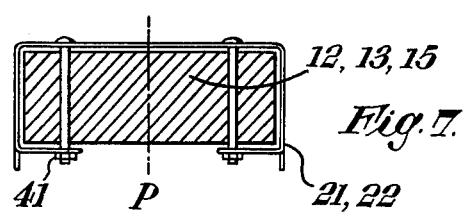
FIG. 7 is a cross-sectional view of an attachment means (21,22).

FIG. 7 illustrates in cross section the details of the attachment means 21, 22 for securing the structural members thereto by through-passing bolts 41. Additionally, P denotes the plane which extends normal to the pivot axis of the pivot 25. As stated above, the structural member received in the mouth 23 or the mouth 24 extends transversely to the plane P.

Accordingly, by the present invention, a single structural connector is provided which may be employed for a trestle joint or a gable joint.

While a particular embodiment has been chosen to illustrate the invention, it will be understood by those skilled in this art that various changes and modifications can be made therein without departing from the scope of the invention as defined in the appended claims.

What I claim as my invention and desire to secure by Letters Patent of the United States is:

1. A structural connector comprising
   a first connector portion having a first fixing surface to which a first structural member may be secured and having first and second securing surfaces;
   a second connector portion having a second fixing surface to which a second structural member may be secured and having third and fourth securing surfaces; and
   coupling means pivotally connecting said first and second connector portions for pivoting said first and second connector portions about a pivot axis between a first position in which said first and second fixing surfaces are arranged at a first angle and said first and third securing surfaces form a first mouth for receiving a third structural member and a second position in which said first and second fixing surfaces are arranged at a second angle and said second and fourth securing surfaces form a second mouth for receiving a third structural member.

2. A structural connector according to claim 1, wherein said first and third securing surfaces are parallel in said first position and said second and fourth securing surfaces are parallel in said second position.

3. A structural connector according to claim 1, wherein each of said first and second mouths receives the third structural member in a position in which the third structural member extends transversely of a plane extending normal to said pivot axis.

4. A structural connector according to claim 1, wherein said first angle is substantially 40° and said second angle is substantially 120°.

5. A structural connector according to claim 1, wherein said connector is in one of said first and second positions; and in combination with first and second structural members secured to said first and second fixing surfaces, respectfully, and with a third structural member received in one of said first and second mouths.

6. A structural connector according to claim 1, in combination with
a second connector comprising
    a third connector portion having a third fixing surface to which a structural member may be secured and having fifth and sixth securing surfaces,
    a fourth connector portion having a fourth fixing surface to which a structural member may be secured and having seventh and eighth securing surfaces, and
    second coupling means pivotally connecting said third and fourth connector portions for pivoting said third and fourth connector portions about a pivot axis between a first position in which said third and fourth fixing surfaces are arranged at a first angle and said fifth and seventh securing surfaces form a third mouth for receiving a structural member and a second position in which said third and fourth fixing surfaces are arranged at a second angle and said sixth and eighth securing surfaces form a fourth mouth for receiving a structural member;
the first mentioned connector being in its first position and said second connector being in its second position;
a structural member secured to each of said fixing surfaces of said connectors; and
a common structural member received in said first mouth of the first mentioned connector and in said fourth mouth of said second connector.

7. A structural connector according to claim 1, wherein said first and second securing surfaces are located on opposite ends of said first connector portion, and said third and fourth securing surfaces are located at opposite ends of said second connector portion.

* * * * *